Figure 1:
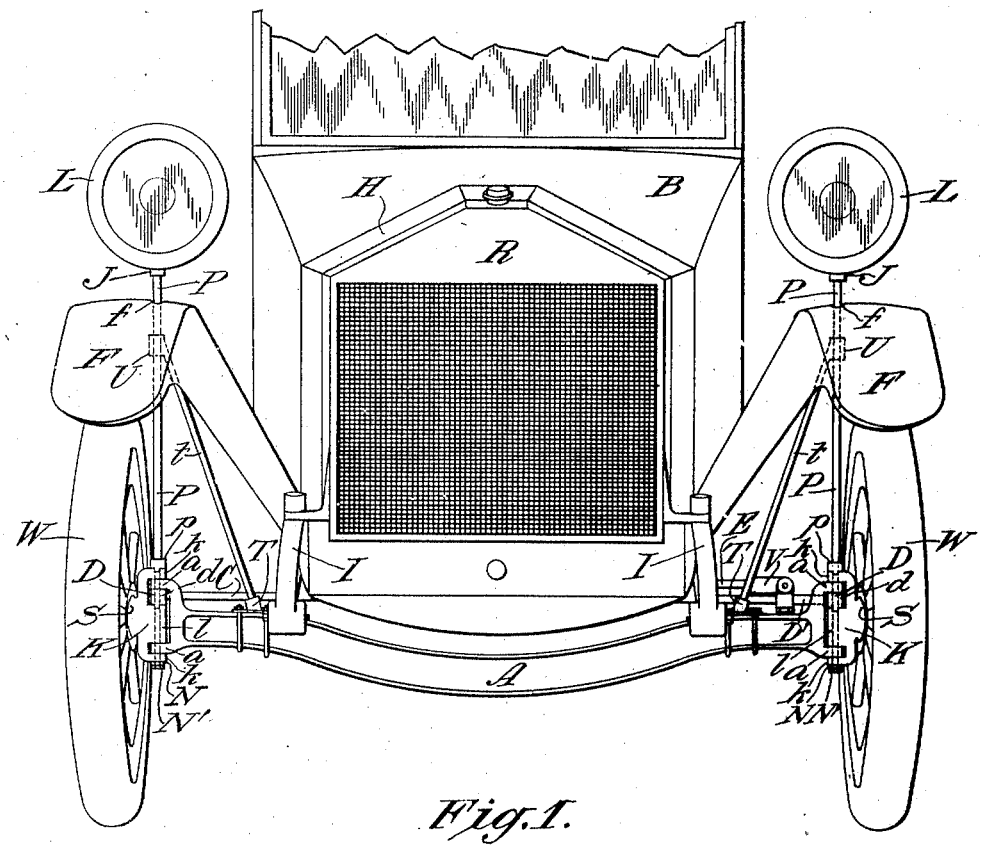

T. MANSOUR.
STEERING GEAR FOR AUTOMOBILES.
APPLICATION FILED SEPT. 25, 1918.

1,334,706.

Patented Mar. 23, 1920.
2 SHEETS—SHEET 1.

INVENTOR:
Trufi Mansour
By
Arthur P. Armington
ATTORNEY

T. MANSOUR.
STEERING GEAR FOR AUTOMOBILES.
APPLICATION FILED SEPT. 25, 1918.

1,334,706.

Patented Mar. 23, 1920.
2 SHEETS—SHEET 2.

INVENTOR:
Teofil Mansour
By
Arthur F. Armington
ATTORNEY

UNITED STATES PATENT OFFICE.

TEWFIE MANSOUR, OF PROVIDENCE, RHODE ISLAND.

STEERING-GEAR FOR AUTOMOBILES.

1,334,706.  Specification of Letters Patent.  Patented Mar. 23, 1920.

Application filed September 25, 1918. Serial No. 255,587.

*To all whom it may concern:*

Be it known that I, TEWFIE MANSOUR, a citizen of the State of Mount Lebanon, Syria, residing at Providence, in the county of Providence, State of Rhode Island, have invented certain new and useful Improvements in Steering-Gears for Automobiles.

My invention consists of an improved steering-gear for automobiles. The object of my improvement is to provide a simplified form of steering-mechanism for the front wheels of the automobile which may be combined with a mounting for the headlights, whereby the latter are directly connected with the steering-knuckles so as to be turned therewith in different directions under the control of the driver in directing the course of the car.

The manner and means for carrying out the improvement are fully described in the following specification, illustrated by the accompanying drawings, in which like reference characters designate like parts. In the drawings:—

Figure 2:
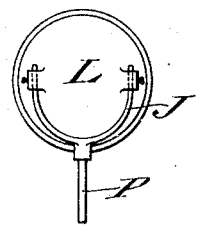
Figure 3:
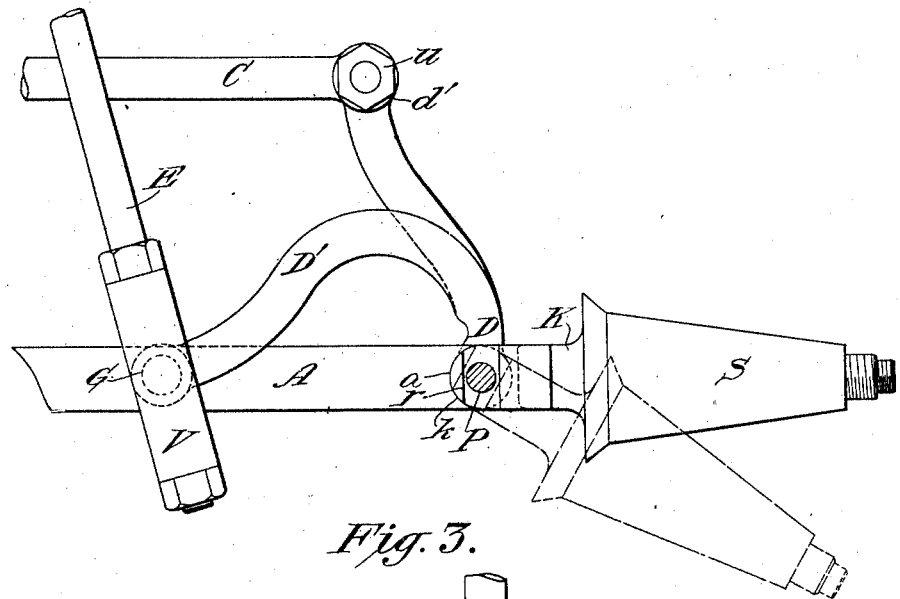
Figure 4:
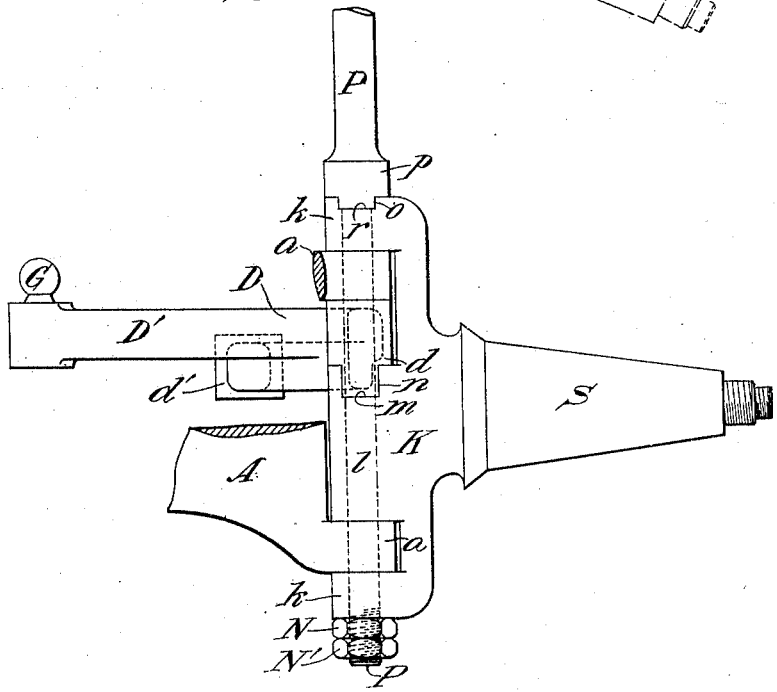

Figure 1 is a front view of an automobile showing my improved device applied thereto;

Fig. 2, a detail view of the upper portion of the headlight mounting, showing the fork on which the lamp is supported;

Fig. 3, an enlarged, plan view of my improved steering-knuckle showing the steering-connections; and Fig. 4, an elevation of the same.

Referring to the drawings, Fig. 1 illustrates the front end of the chassis of an automobile of conventional type comprising the body B, the engine-hood H and radiator R, which are mounted on side-sills I supported on springs attached to a rigid front axle or cross-beam A. In accordance with the usual construction in vehicles of this type, the front-wheels W, W are journaled on spindles S carried by steering-knuckles K hinged to the ends of the fixed axle A to adapt them to swivel in relation thereto under the control of a steering-wheel at the driver's station. For this purpose the axle A is provided with forked arms $a$, $a$, see also Fig. 4, and in my present, improved construction the steering-knuckles K are formed with forked lugs or arms $k$, $k$ which overlap the arms $a$, $a$ on the top and bottom thereof. Preferably the knuckles K are forged or cast in one piece with a tapered spindle S projecting at one side on which the wheel is journaled by means of ball- or roller-bearings as usually provided. At the inner end of the spindle S is an upright arm K formed with the lugs $k$, $k$ at top and bottom, and a third, square lug or extension $l$ abuts the top of the lower arm $a$ of the axle-fork. The lug $l$ is slotted at $m$ across its top to provide for coupling it to the steering-arm D, and a similar arm on the opposite steering-knuckle K is connected with it to adapt the wheel-spindles S to move together when operated from the steering-wheel. Referring to Figs. 3 and 4, the steering-arm D is formed with a hub $d$ having a key or spline $n$ on its under side adapted to fit the slot $m$ in the lug $l$ to connect the two parts to turn together on their pivot P. The hub $d$ abuts the under side of the upper lug $a$ on the axle-fork and in this manner the parts are assembled to fit together in close relation to prevent play or lost motion.

The pivot or pintle for the steering-knuckle K consists of the rod P which is inserted through vertical bores in the arms $k$, $k$ and $a$, $a$; hub $d$ and lug $l$. At its upper end the pintle P is formed with an enlargement or collar $p$ provided on its under side with a key $o$ fitted to a slot $r$ in the arm $k$ of the steering-knuckle K. On the lower end of the rod P is a nut N which is set snugly against the lower arm $k$ of the steering-knuckle K to draw the parts together, and usually a check-nut N' is applied below the nut N to prevent the latter from becoming loose. The above described connection keys the pintle or pivot-rod P to the knuckle K so that it will turn therewith, the purpose of this arrangement being to adapt the rod for turning the headlights of the car when the front wheels are turned in steering. The arrangement of this latter feature of the device is described more fully hereinafter, and it will suffice for the present to state that the rod P is extended upwardly to adapt it to serve as the main support for the headlight or front lamp of the car.

Referring still to Figs. 3 and 4, the steering-arm D extends rearwardly from its hub $d$ and is provided at its end with an enlargement or hub $d'$. This latter is adapted to fit within the forked end of a draw-bar or connecting-rod C extending across to the arm D on the opposite steering-knuckle K, the rod C being attached to the arms D by suitable bolts and nuts $u$ as shown in Fig. 3. The couplings between the rod R and the arms D are the same at both ends and through this arrangement the two steering-knuckles are connected to move together to turn the front wheels to steer the car. One or the other of the opposite steering-arms D is formed with a curved extension D' for connecting it with the steering-rod E which is moved from the steering-wheel. When the car is to be steered from the left side, as is the preferred arrangement in most pleasure automobiles, the left-hand arm D carries the extension D' as shown in Fig. 3. At its end is a stud G formed with a ball on its top which is received within an opening on the under side of a cylindrical sleeve V. The sleeve V forms an extension of the steering-rod E and incloses relatively stiff springs, not herein shown, which hold the stud G in its bearings. This form of connection is common to practically all types of steering-gear for automobiles, and need not therefore be herein explained in detail. Suffice it to state that when the rod E is moved longitudinally, under the control of the steering-wheel at the operator's station, it will act on the arm D' to turn the steering-knuckle K on its pivot P; and the main arm D being connected by the draw-bar C to the arm D on the opposite knuckle K, see Fig. 1, both wheels W, W will be turned in unison to control the direction of movement of the car.

As before mentioned, the pivot-rod P for each steering-knuckle K is extended upwardly and, as shown in Fig. 2, carries a fork J at the top which serves as a mounting for the usual headlight or lamp L. On cars of the pleasure type the front wheels W, W are surmounted by overhanging mud-guards or fenders F and these are provided with suitable openings $f$ through which the rods P project. The openings $f$ are large enough to provide clearance for the rods P so that when the body of the car rocks or sways on its springs the fenders F will not strike against the rods. To prevent the rods P from bending or vibrating under road shocks, I have found it advisable to provide a brace or reinforcement for their upper ends. As illustrated in Fig. 1, the reinforcing-means may consist of bearings U, U supported at the ends of inclined rods or braces $t, t$. The rods $t, t$ are mounted in brackets T, T strapped or bolted to the rigid axle A, or they might be arranged in any other manner as preferred.

It will be observed that my improvement provides a unitary fitment for automobiles which, besides functioning as a part of the steering-gear, also serves as a mounting for the headlights to adapt the latter to turn with the front wheels. That is to say, the headlights are directly connected with the steering-knuckles to be operated therefrom without the use of gears, chains, levers, links or other intermediary parts. In this way I provide the desired feature of dirigibility in the headlights, so that the light therefrom will be thrown in the direction in which the car is traveling in turning a corner. Through the direct connection of the headlights with the steering-knuckles I avoid play and lost motion between the parts while also simplifying the construction and rendering the mechanism proof against derangement or getting out of order.

Another advantageous feature of my improvement consists in the two-part construction of the steering-knuckle and its arm. Heretofore, it has been the usual practice to form these parts integral in one piece, and when one became damaged or broken it required the replacement of the complete fitting. In the present construction the steering-arm is made separate from the knuckle, but is keyed thereto so that the two parts operate as one. With this arrangement, if the arm is broken it may be replaced at relatively slight cost without requiring the substitution of a complete steering-knuckle including the wheel-spindle and its bearings. Other advantages of my improvement arise from the simplicity and low cost of manufacture of the parts of the apparatus and will be obvious to those skilled in the art.

Various modifications might be made in the structure and arrangement of the parts of the device without departing from the spirit or scope of the invention; therefore, without limiting myself to the exact embodiment herein shown and described, what I claim is:—

1. In a steering-gear for automobiles, the combination with the fixed front axle of the car formed with a forked-bearing at its end, of a steering-knuckle fitted to said bearing and provided with a lug arranged between the forks thereof, a steering-arm formed with a part overlapping the lug on the steering-knuckle and keyed thereto, and a pivot-rod extending through all of the several parts named to hold them in position on the bearing while adapting them to turn with the rod under power applied through the steering-arm.

2. In a steering-gear for automobiles, the combination with the fixed front axle of the car formed with a forked-bearing at its end, of a steering-knuckle having forked-arms embracing the arms of the axle-fork, said knuckle formed with a lug projecting between the arms of the axle-fork, a steering-arm having a hub also inclosed between the arms of the axle-fork and keyed to the lug on the steering-knuckle, and a pivot-rod extending through the forked-arms and the hub and lug to hold the parts together in hinged relation while adapting it to serve as a support for a headlight.

In testimony whereof I affix my signature.

TEWFIE MANSOUR.